United States Patent [19]

Clow

[11] 3,775,179

[45] Nov. 27, 1973

[54] MAGNETIC RECORDING MEDIA

[75] Inventor: Hugh Clow, Reading, England

[73] Assignee: EMI Limited, Hayes, Middlesex, England

[22] Filed: Feb. 24, 1970

[21] Appl. No.: 13,463

[30] Foreign Application Priority Data

Feb. 22, 1969 Great Britain ..................... 9,647/69

[52] U.S. Cl. ................. 117/240, 117/235, 117/238, 117/107.2, 252/62.55

[51] Int. Cl. ............................................ H01f 10/02

[58] Field of Search .................... 117/235, 238, 239, 117/240, 107.2; 252/62.55; 75/171

[56] References Cited

UNITED STATES PATENTS

| | | | |
|---|---|---|---|
| 3,551,202 | 12/1970 | Wright | 117/240 |
| 3,360,397 | 12/1967 | Koretzky | 117/240 |
| 3,525,635 | 8/1970 | Haller | 117/240 |
| 3,525,638 | 8/1970 | Archey | 117/240 |
| 3,414,430 | 12/1968 | Maho | 117/240 |
| 3,146,380 | 8/1964 | Clark | 75/171 X |
| 3,206,325 | 9/1965 | Averbach | 117/107.2 X |
| 2,809,127 | 10/1957 | Gibson | 117/107.2 X |
| 3,385,739 | 5/1968 | Danis | 75/171 X |
| 3,235,379 | 2/1966 | Scruggs | 75/171 |

*Primary Examiner*—William D. Martin
*Assistant Examiner*—Bernard D. Pianalto
*Attorney*—William W. Downing, Jr.

[57] ABSTRACT

A magnetic recording medium comprises a base material provided with a layer of magnetic metal, wherein the magnetic metal is a mixture of cobalt and chromium containing chromium in the range from 1 to 20%. Preferably chromium constitutes 3 to 10% of the mixture, the layer is in the thickness range from 0.1 to 1$\mu$ and the base material is provided with the layer by evaporation of cobalt and chromium thereon.

6 Claims, 1 Drawing Figure

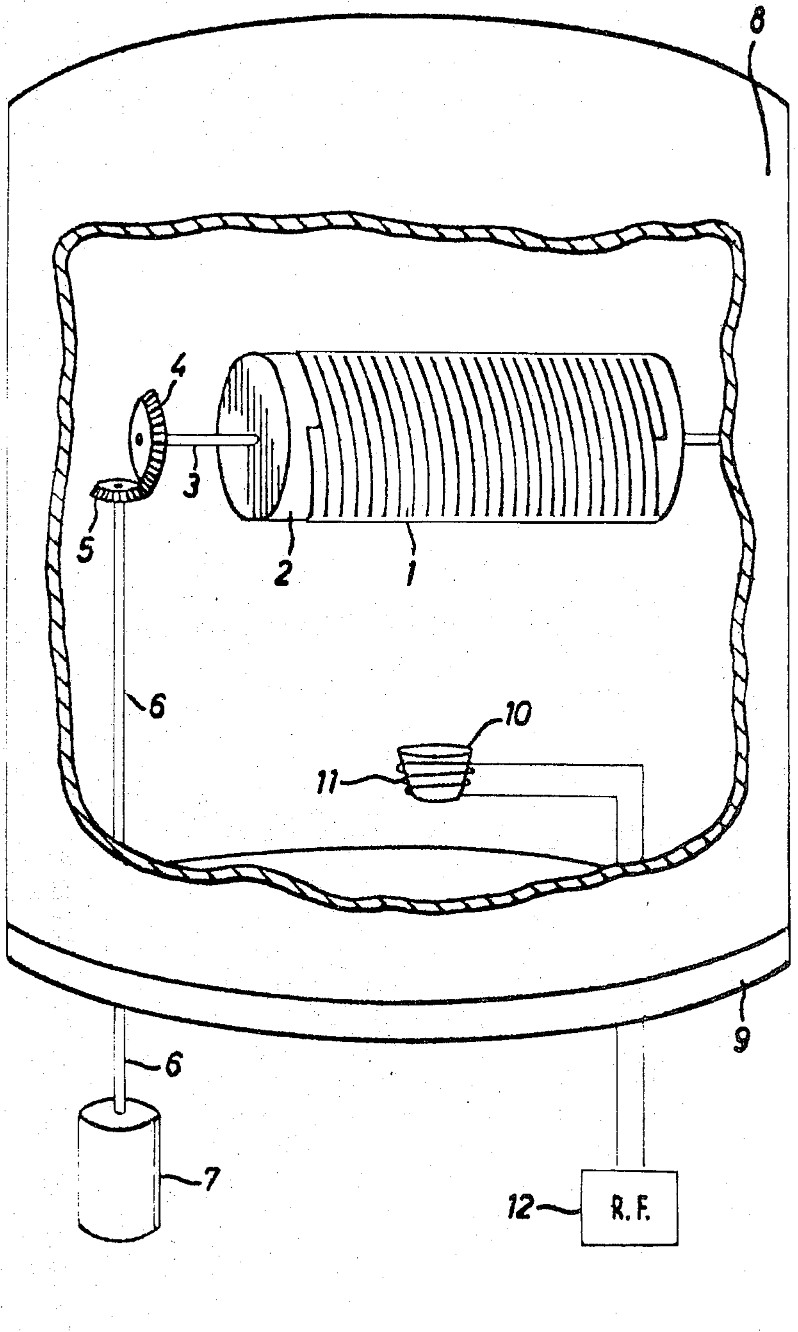
8
4
3
5
2
1
6
10
11
9
6
7
12
R.F.

MAGNETIC RECORDING MEDIA

This invention relates to magnetic recording media, and it relates especially though not exclusively to magnetic recording tape made by coating a base material with a layer of magnetic metal.

Conventional magnetic recording tapes are coated with magnetic oxide powder bonded to the base material by means of a bonding agent. However it has been proposed to produce magnetic recording tapes in which the plastics base material is coated with a layer of magnetic metal. According to one proposal, the plastics base material is coated with cobalt by a vacuum evaporation process. The magnetic recording tapes so produced tend however to have a relatively low coercive force, to be prone to chemical corrosion and to have relatively poor adhesion to the base material so that they are subject to mechanical wear. Tapes made in this way have not found commercial acceptance. In another proposal, a recording medium is made by a method in which successive layers of chromium and cobalt are deposited by evaporation on a base material of metal or glass, but this method suffers from two disadvantages. Firstly the base material must be at a high temperature during deposition to give a high enough coercivity, and this temperature is such that it would melt the base materials used for magnetic tapes; and secondly a relatively high proportion of chromium needs to be used. Media made in this way do not seem to have found commercial acceptance either.

It is an object of the present invention to provide an improved magnetic recording medium comprising a base material provided with a layer of magnetic metal; and a method of manufacturing said medium.

According to the invention from one aspect there is provided a recording medium comprising a substrate provided with a layer which consists of a mixture of cobalt and chromium, the chromium being distributed throughout the thickness of the layer such that the percentage by weight of chromium in the mixture lies in the range from 1% to 20%.

According to the invention from another aspect there is provided a method of manufacturing a magnetic recording medium including the step of depositing cobalt and chromium onto a common substrate to form a layer on said substrate which consists of a mixture of cobalt and chromium, the chromium being distributed throughout the thickness of the layer such that it constitutes from 1% to 20% by weight of said mixture.

According to the invention from yet another aspect there is provided a method of manufacturing a recording medium wherein cobalt and chromium are deposited on a common substrate to form a layer which consists of a mixture of cobalt and chromium, the chromium being distributed throughout the thickness of the layer such that it constitutes from 1% to 20% by weight of the mixture, and wherein the mixture adjacent the substrate contains a higher percentage by weight of chromium than does the mixture adjacent the surface of the layer.

According to respective features of the invention, the chromium constitutes 3% to 10% by weight of the mixture; the thickness of the layer is in the range from 0.1 to 1$\mu$; the base material is provided with the layer by evaporation of chromium and cobalt thereon; the base material is a film of polyester material; and the layer is such that adjacent the base material it contains a higher percentage of chromium than at its surface.

In order that the invention may be fully understood and readily carried into effect, it will now be described with reference to the single figure of the accompanying drawing, which shows apparatus partly in section according to one example of the invention.

According to this example of the invention, the cobalt and chromium are evaporated from an ingot formed from a mixture of them onto a base film of a plastics material such as polyester, for example a film of the material known by the British Registered Trade Mark "Melinex", in such a way that the layer on the film contains 5% by weight of chromium and 95% by weight of cobalt. The ingot is evaporated from a crucible in a vacuum of from $0.5 \times 10^{-4}$ to $1 \times 10^{-4}$ mm Hg, and the evaporation is controlled to form a layer on the film of ½$\mu$ thickness. The layer produced has a coercivity of 500Oe, and a remanent induction $B_R$ of 8,000 lines per square centimetre.

Referring to the single FIGURE of the accompanying drawing, an evacuatable chamber 8 contains a rotatably mounted aluminium drum 2 of 6 inches diameter, which is placed about 15 inches above a crucible 10. A film 1 in the form of a strip of polyester material is wrapped in a spiral form round drum 2 as shown. Drum 2 is rotated on a shaft 3 which is coupled to a bevel wheel 4. Bevel wheel 4 is rotated by means of another bevel wheel 5, bevel wheel being rotated by another shaft 6 which is coupled to a motor 7. Bevel wheels 4 and 5 are situated inside chamber 8, and shaft 6 passes through the base plate 9 of chamber 8 to motor 7 which is situated outside chamber 8.

The crucible 10 has a winding 11 which is fed with energy from a radio frequency source 12 which is located outside chamber 8, the leads to winding 11 passing through base plate 9. In operation an ingot containing about 50 grams of chromium/cobalt mixture, and containing 2% by weight of chromium is placed in crucible 10; chamber 8 is evacuated, and the ingot inductively heated by the field due to windings 11, reaching an estimated temperature of 1,600°–1,800°C. While the ingot evaporates drum 2 is caused to rotate at about 75 r.p.m., cobalt and chromium being deposited as a layer on the film 1. In this way the layer is built up progressively. It will be appreciated that the evaporated material can impinge on the film 1 over a range of angles of incidence from normal incidence to grazing incidence. It has been found that a layer about ½$\mu$ thick can be built up in about 15 minutes in a pressure of $1 \times 10^{-4}$ mm Hg on a 6 foot length of film, such a layer having a coercivity of 500Oe and a remanent induction $B_R$ of 8,000 lines per square centimetre as mentioned above. A layer deposited in similar fashion to that just described, but with the evaporated material permitted only to impinge on the film 1 at normal incidence, exhibits a coercivity of 300 Oe.

The temperature of the film 1 is kept low by virtue of the mass of drum 2. This is necessary because not only would the film melt in temperatures above about 200°C, but even at temperatures below this it tends to become distorted and hence unusable. Another reason for maintaining the film at a low temperature is that if depositions are carried out at temperatures of about 100°C or more using this method, coercivities as low as 20Oe are yielded.

Chromium evaporates more quickly than cobalt, hence the initial part of the layer mentioned above (i.e. that exhibiting a coercivity of 500 Oe) is chromium rich compared with rest. The initial part of the layer contains about 20% by weight of chromium, and the surface part about 4%, the average percentage by weight of chromium overall being about 5%. If the layer had a constant composition with 5% by weight of chromium, the coercivity would be about 220Oe (pure cobalt giving about 120Oe), so this effect (of a variable distribution of chromium through the thickness of the layer) is advantageous.

Thus recording media according to the invention have, relative to comparable media made by coating the base material with the metal cobalt, a higher coercive force, and an increased remanent induction, and it has also been found that they have improved adhesion to the base material, reduced mechanical wear on playing and are less prone to chemical corrosion. Furthermore it has also been found that the use of chromium/cobalt mixture tends to improve the "squareness" of the hysteresis loop.

Also, compared with magnetic oxide tapes, an improvement in the digital recording packing density is provided; for example a tape made according to the invention with a layer thickness of 0.35$\mu$; a remanent induction of 6,000 lines per square centimetre; and a coercivity of 420Oe yielded a packing density of more than twice that of a 6$\mu$ thick $\gamma Fe_2O_3$ tape.

Improved results can be obtained from other mixtures of cobalt and chromium containing chromium in the range from 1 to 20% by weight. This range is critical because chromium in proportions by weight of less than 1% does not have any beneficial effect on the performance, and chromium in proportions by weight of greater than 20% tends to render the layer substantially non-magnetic. Preferable amounts of chromium are in the range from 3 to 10% by weight, the best results having been obtained in this range and preferable layer thicknesses are from 0.1 to 1$\mu$. It is also possible to make magnetic recording media using a chromium/-cobalt micture according to the invention by inducing magnetic orientation, that is by depositing the layer at a suitable angle of incidence in a magnetic field.

Evaporation of the magnetic metal on the base material may also be carried out by feeding a wire into an evaporator, the wire being formed either of a mixture, or from cobalt coated with chromium; or by using separate cobalt and chromium sources such as ingots or wires. For manufacturing longer lengths of recording media, the film can be wound on "take-up" spools and passed back and forth past an evaporating source or sources, so as to build up the layer successively; or past several sources in series. It will be appreciated that the invention encompasses any method of providing a base material with a layer of the requisite composition, such as sputtering techniques.

What I claim is:

1. A magnetic recording medium comprising a substrate provided with a layer which consists of a mixture of cobalt and chromium, the chromium being distributed throughout the thickness of the layer such that the percentage by weight of chromium in the mixture lies in the range from 1% to 20%.

2. A medium according to claim 1 in which the percentage by weight of chromium in the mixture lies in the range from 3% to 10%.

3. A magnetic recording medium according to claim 1 wherein the thickness of said layer is in the range from 0.1 to 1$\mu$.

4. A magnetic recording medium according to claim 3 wherein said substrate comprises a film of a plastics material.

5. A magnetic recording medium according to claim 1 wherein said mixture is such that adjacent said substrate it contains a higher percentage by weight of chromium than at the surface of said layer.

6. A magnetic recording medium according to claim 5 wherein, adjacent the substrate, chromium constitutes about 20% by weight of said mixture, and at the surface of the layer chromium constitutes about 4% by weight of said mixture.

* * * * *